(12) United States Patent
Jin (10) Patent No.: US 8,911,896 B2
(45) Date of Patent: Dec. 16, 2014

(54) BATTERY PACK

(75) Inventor: Hee-Joon Jin, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 410 days.

(21) Appl. No.: 13/281,747

(22) Filed: Oct. 26, 2011

(65) Prior Publication Data

US 2012/0315529 A1 Dec. 13, 2012

(30) Foreign Application Priority Data

Jun. 13, 2011 (KR) .................. 10-2011-0056849

(51) Int. Cl.
*H01M 10/50* (2006.01)
*H01M 10/656* (2014.01)
*H01M 10/647* (2014.01)
*H01M 10/6556* (2014.01)
*H01M 10/6557* (2014.01)
*H01M 10/613* (2014.01)

(52) U.S. Cl.
CPC ...... *H01M 10/5004* (2013.01); *H01M 10/5061* (2013.01); *H01M 10/5032* (2013.01); *H01M 10/5057* (2013.01); *H01M 10/5059* (2013.01)
USPC ........................................................ 429/120

(58) Field of Classification Search
CPC ............ H01M 10/50; H01M 10/5057; H01M 10/5004; H01M 10/5032; H01M 10/5059; H01M 10/5061; Y02E 60/12

USPC ........................................................ 429/120
See application file for complete search history.

(56) References Cited

U.S. PATENT DOCUMENTS

| 4,592,972 A * | 6/1986 | Juergens et al. ............... 429/160 |
| 2003/0017384 A1 | 1/2003 | Marukawa et al. |
| 2010/0330408 A1 | 12/2010 | Yoon et al. |

FOREIGN PATENT DOCUMENTS

| JP | 2003-036819 A | | 2/2003 |
| JP | 2008-059950 A | | 3/2008 |
| JP | 2008059950 A | * | 3/2008 |
| JP | 2009-043453 A | | 2/2009 |
| JP | 2010-040345 A | | 2/2010 |
| JP | 2010-040420 A | | 2/2010 |
| KR | 10-2009-0047927 A | | 5/2009 |
| WO | WO 2006/093010 A1 | | 8/2006 |

OTHER PUBLICATIONS

Korean Office Action dated Oct. 11, 2012.
Korean Notice of Allowance dated Apr. 1, 2013 for Korean Application No. 10-2011-0056849 (Jin).

* cited by examiner

*Primary Examiner* — Gary Harris
(74) *Attorney, Agent, or Firm* — Lee & Morse, P.C.

(57) ABSTRACT

A battery pack includes a battery module having at least one battery cell, and at least one heat dissipation plate in contact with the battery cell, the heat dissipation plate having at least one channel configured to include a refrigerant, a rib arranged to define a frame of the heat dissipation plate, and a through-hole between the channel and the rib.

17 Claims, 8 Drawing Sheets

BATTERY PACK

BACKGROUND

1. Field

Example embodiments relate to a battery pack capable of improving a heat dissipation property.

2. Description of the Related Art

In general, a secondary battery, which can be charged and discharged, may be used repeatedly. The secondary battery may include at least one battery cell that can be used in a portable small-sized electronic apparatus, e.g., a cellular phone, a notebook computer, a computer, a camera, a camcorder, and the like, or used in a battery pack including a plurality of battery cells, e.g., in a motor driving power supply of a high-power hybrid electric vehicle (HEV), electric vehicle (EV), and the like.

SUMMARY

Example embodiments are directed toward a battery pack with a heat dissipation plate capable of improving a heat dissipation property.

An exemplary embodiment provides a battery pack, including a battery module including at least one battery cell, and at least one heat dissipation plate in contact with the battery cell, the heat dissipation plate having at least one channel configured to include a refrigerant, a rib arranged to define a frame of the heat dissipation plate, and a through-hole between the channel and the rib.

The channel may extend through the rib and may include at least one protrusion.

The heat dissipation plate may further include a connection groove at an end of the at least one channel.

The heat dissipation plate may further include a connector connected to the connection groove, the connection groove being between the connector and the channel.

The heat dissipation plate may further include a connection pipe connected to the connection groove, the connection groove being between the connection pipe and the channel.

The connection pipe may connect two adjacent channels in the heat dissipation plate.

The heat dissipation plate may include at least two separate heat dissipation plate portions, the at least two heat dissipation plate portions being adjacent to each other, and the connection pipe connects channels in the at least two heat dissipation plate portions.

The battery pack may further include at least one joint in the heat dissipation plate.

The joint may be on a sidewall or on a bottom of the heat dissipation plate, the joint being placed where the battery module, the channel, the rib, and the through-hole are not positioned.

The battery pack may further include a joining member, the joining member being coupled to the joint to connect adjacent heat dissipation plate portions of the heat dissipation plate.

A plurality of battery cells in the battery module may be placed in parallel to a gravity direction, the heat dissipation plate being below at least one battery module.

A plurality of battery cells in the battery module may be placed in parallel to a ground direction, the heat dissipation plate being between the adjacent battery modules.

The rib and channel of the heat dissipation plate may be integral with each other.

The heat dissipation plate may include a heat conductive metallic material.

The heat dissipation plate may include aluminum.

The heat dissipation plate may be configured to have the refrigerant flow through the channel in a first direction or in a second direction opposite to the first direction.

The heat dissipation plate may be configured to have the refrigerant flow in opposite directions through adjacent channels.

The heat dissipation plate may be configured to have the refrigerant flow sequentially through a first channel in a first direction and through a second channel adjacent the first channel in a second direction opposite the first direction.

BRIEF DESCRIPTION OF THE DRAWINGS

The above and other features and advantages will become more apparent to those of ordinary skill in the art by describing in detail exemplary embodiments with reference to the attached drawings, in which:

FIGS. 7A to 8 illustrate mimetic diagrams of flow directions of a refrigerant in the heat dissipation plate of FIG. 3A.

DETAILED DESCRIPTION

Korean Patent Application No. 10-2011-0056849, filed on Jun. 13, 2011, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element, e.g., a layer, is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Further, it will also be understood that when a layer is referred to as being "connected to" another layer, it can be directly connected to the other layer, or one or more intervening layers may also be present. Like reference numerals refer to like elements throughout.

Hereinafter, exemplary embodiments of a battery pack will be described with reference to FIGS. 1-3B.

Figure 1:
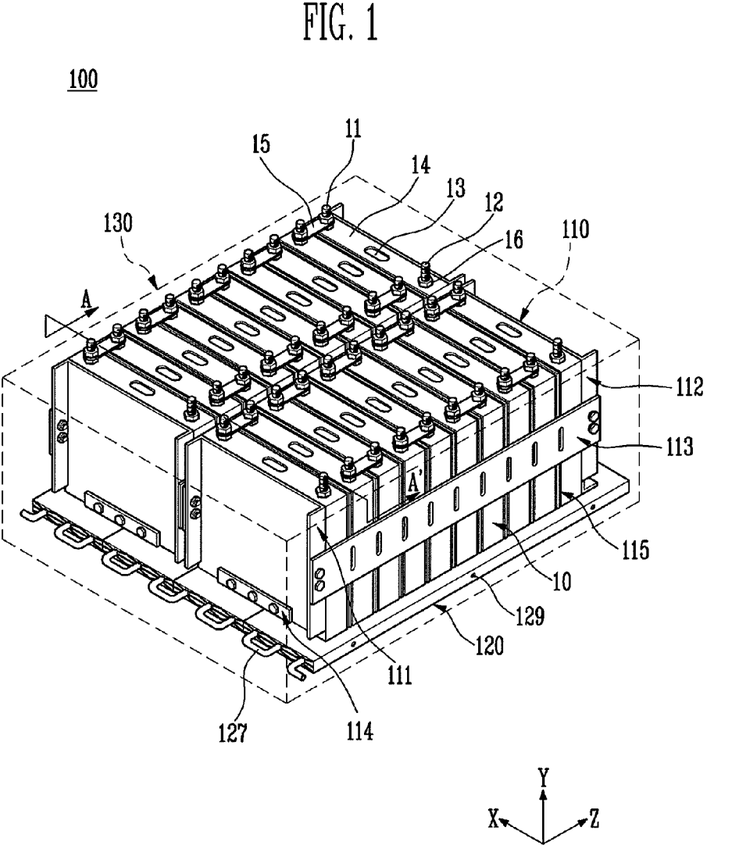
FIG. 1 illustrates a perspective view of a battery pack according to an exemplary embodiment.
Figure 2:
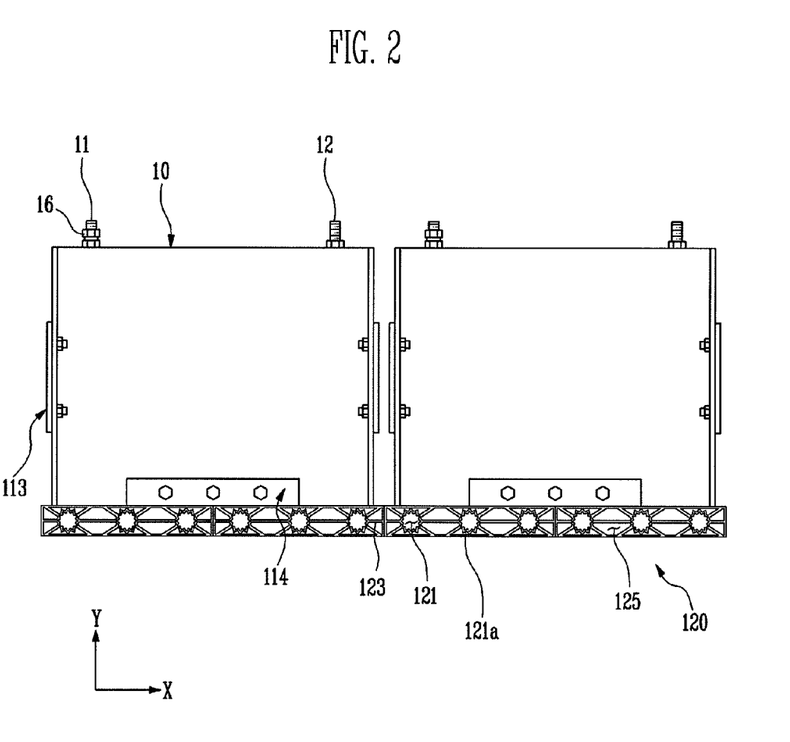
FIG. 2 illustrates an enlarged cross-sectional view along line A-A' of FIG. 1.

Referring to FIGS. 1 and 2, a battery pack 100 according to a first exemplary embodiment may include a battery module 110, e.g., a vertically placed battery module 110, having at least one battery cell 10 and at least one heat dissipation plate 120 placed below the battery cell 10. The heat dissipation plate 120 may contact, e.g., directly contact, the battery cell 10, and may include at least one channel 121, at least one rib 123, and a through-hole 125. Herein, the channel 121 functions as a passage for a refrigerant, the rib 123 maintains a frame, e.g., defines a supporting structure, of the heat dissipation plate 120, and the through-hole 125 is an empty space positioned between the channel 121 and the rib 123.

Herein, the battery cell 10 in the battery module 110 may be placed in parallel to a gravity direction and the dissipation plate 120 may be placed below at least one battery module 110. In other words, the battery cell 10 may be positioned vertically, i.e., a bottom of the battery cell 10 may be a narrow surface, so the bottom of the battery cell 10 may be between the dissipation plate 120 and an interior of the battery cell 10. When a plurality of battery cells 10 are aligned vertically along one direction, e.g., along the z-axis, a plurality of adjacent heat dissipation plates 120 may be arranged, e.g., as a flat structure, to overlap, e.g., completely overlap, bottoms of the aligned battery cells 10, e.g., two adjacent heat dissipation plates 120 along the x-axis may extend along the z-axis and may contact each other and the aligned battery cells 10. The heat dissipation plate 120 may overlap an entire bottom of the battery pack 100, as illustrated in FIG. 1.

Figure 4:
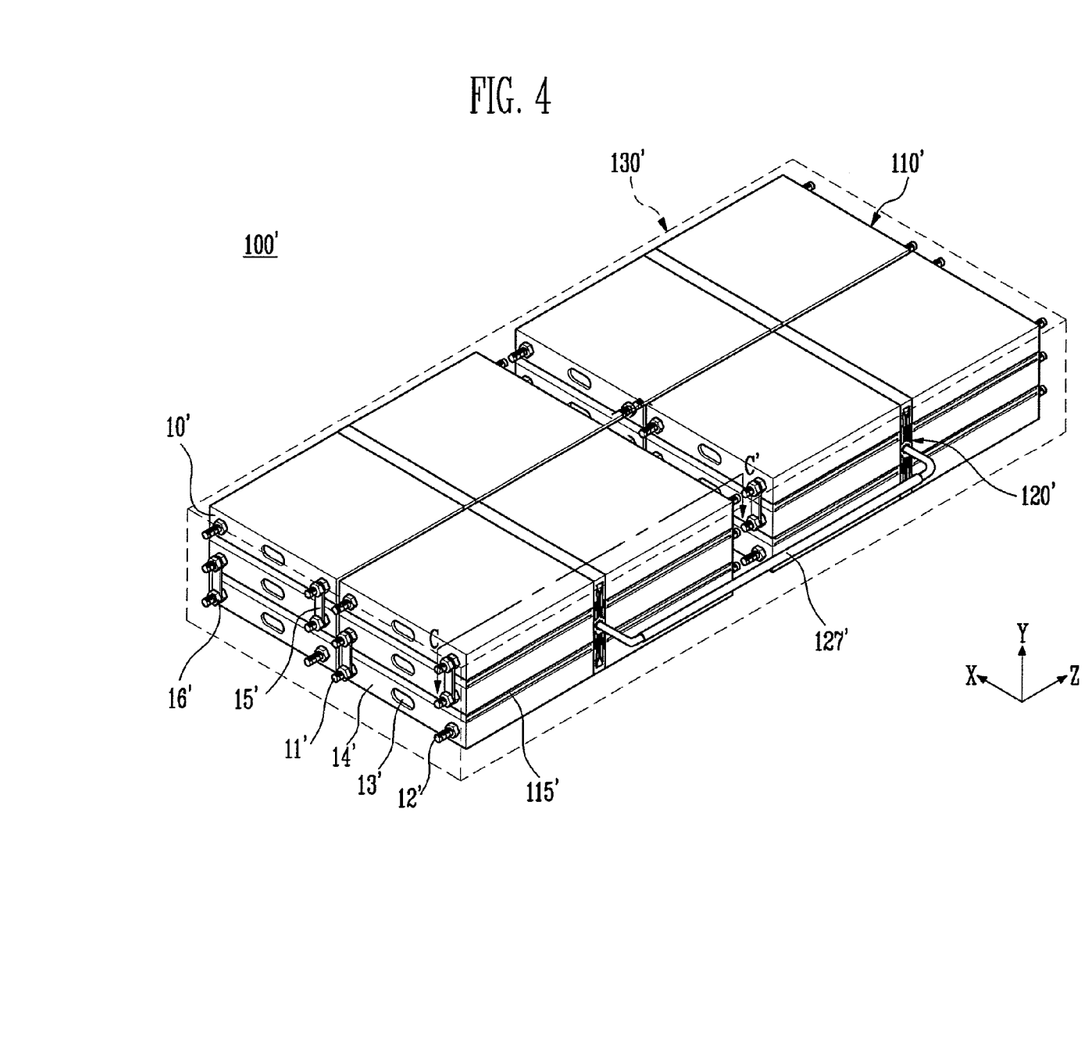
FIG. 4 illustrates a perspective view of a battery pack according to another exemplary embodiment.
Figure 5:
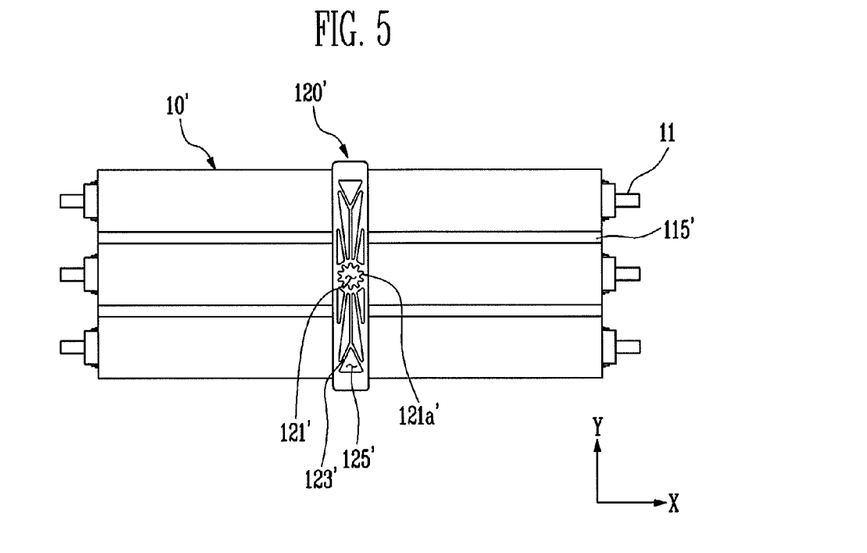
FIG. 5 illustrates an enlarged cross-sectional view along line C-C' of FIG. 4.

In a secondary embodiment, referring to FIGS. 4 and 5, a battery pack 100' may include a battery module 110', e.g., a horizontally placed battery module 110', having at least one battery cell 10 and at least one heat dissipation plate 120' placed adjacent the battery cell 10. The heat dissipation plate 120' may contact the battery cell 10, and may include a channel 121', a rib 123', and a through-hole 125'. The channel 121' functions as a passage for a refrigerant, the rib 123' provides and maintains a frame, e.g., a structure, for the heat dissipation plate 120', and the through-hole 125' is an empty space positioned between the channel 121' and the rib 123'.

Herein, the battery cell 10 in the battery module 110' may be placed in parallel to a ground direction and the dissipation plate 120' may be placed between adjacent battery modules 110'. For example, when a plurality of battery cells 10' are stacked horizontally to form battery modules 110' adjacent to each other, e.g., along the z-axis, a plurality of heat dissipation plates 120' may be arranged among the adjacent battery modules 110', e.g., one heat dissipation plate 120' may be arranged between two adjacent battery modules 110' to overlap the battery modules 110'. For example, as illustrated in FIG. 4, adjacent heat dissipation plates 120' may be separated from each other along the z-axis, and a connection pipe 127' may connect therebetween.

Referring to FIGS. 2, 3A, 5, and 6A, the channels 121,121' are passages for the refrigerant, the ribs 123,123' function as the frame maintaining the heat dissipation plate 120, 120', and the through-holes 125,125' are positioned between the ribs 123,123' and is an empty space that enables smooth heat conduction. In other words, with the exception of the ribs 123,123' and the channels 121,121', an interior of the heat dissipation plate 120,120' may be an empty space. Since the through-hole 125,125' is an empty space, the weight of the heat dissipation plate 120,120' may be substantially decreased.

Figure 3A:
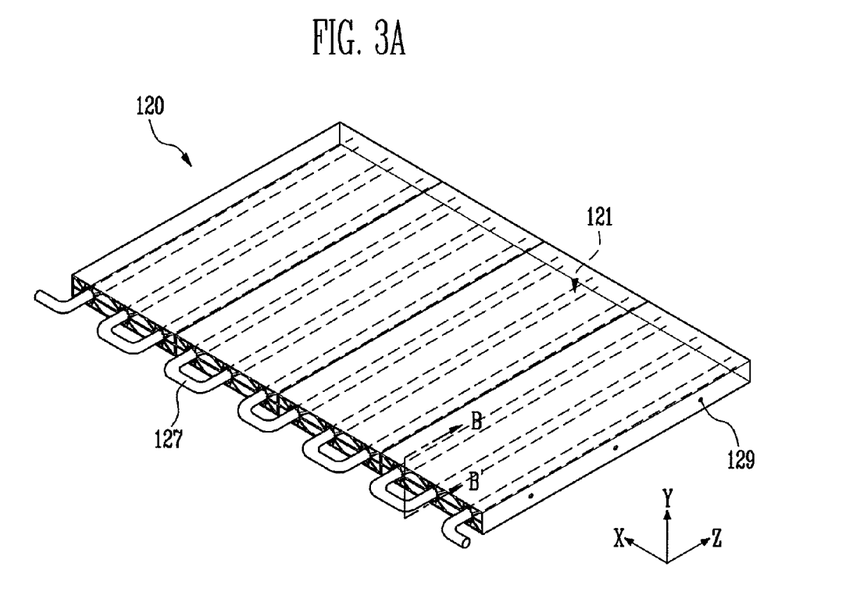
FIG. 3A illustrates an enlarged perspective view of a heat dissipation plate according to an exemplary embodiment.
Figure 6A:
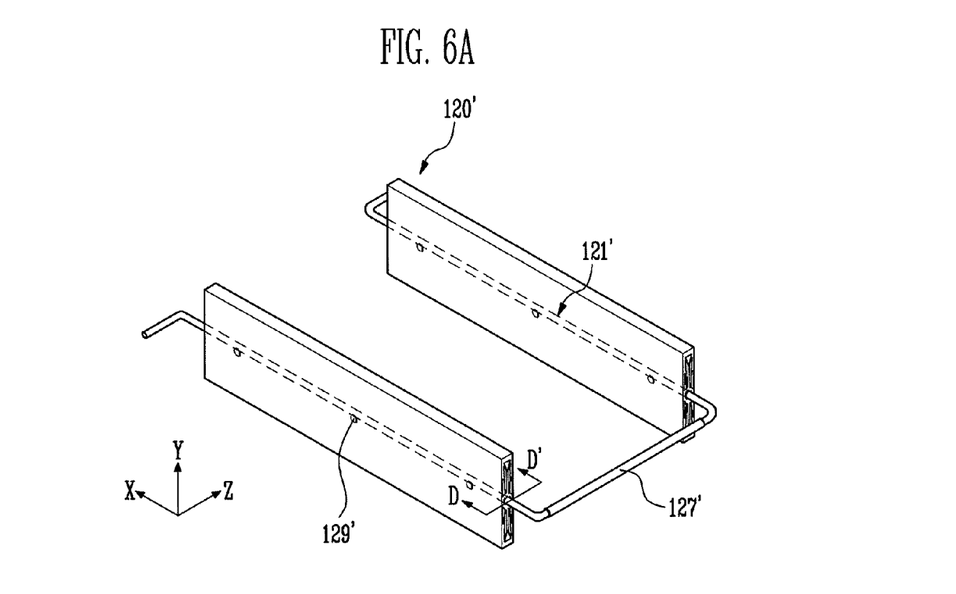
FIG. 6A illustrates an enlarged perspective view of a heat dissipation plate according to another exemplary embodiment.

In detail, as illustrated in FIGS. 2 and 5, the ribs 123,123' may be arranged, e.g., in a criss-cross structure, to provide a support structure for the heat dissipation plates 120,120'. The channels 121,121' may penetrate through the structure of the ribs 123,123'. That is, as illustrated in FIGS. 3A and 6A, the channels 121,121' may extend through a width, e.g., through an entire width, of the heat dissipation plates 120,120'. For example, a plurality of channels 121 may be spaced apart from each other along the x-axis, and may extend through an entire width of the heat dissipation plate 120 along the z-axis, as illustrated in FIG. 3A. In another example, a plurality of channels 121' may be spaced apart from each other along the z-axis, and may extend through an entire width of the heat dissipation plate 120' along the x-axis, as illustrated in FIG. 6A.

The channels 121,121' may have any suitable structure. Further, the channels 121,121' may include at least one protrusion 121a, 121a', so an inner space within each channel 121,121' may have an irregular shape, e.g., may include teeth-shaped protrusions contacting the battery cells 10,10'. For example, each channel 121,121' may include a plurality of protrusions, so a cross-sectional area of each channel 121, 121' may be star-shaped, as illustrated in FIGS. 2 and 5. The protrusion 121a, 121a' may increase a surface area of the channel 121, 121' serving as the passage of the refrigerant, so smoothness and effectiveness of the heat conduction may be increased. For example, an outer diameter of the channel 121,121' may contact, e.g., directly contact, top and bottom surfaces of the heat dissipation plate 120,120'.

Further, at least one joint 129,129' may be further provided in the heat dissipation plate 120,120'. The joint 129,129' may be provided on the side or bottom of the heat dissipation plate 120,120'. The joint 129,129' may be provided in a region where the battery module 110,110', the channel 121,121', the rib 123,123', and the through-hole 125,125' are not positioned. The joint 129,129' and a joining member (not shown) coupled to the joint 129,129' may be joined to each other, such that adjacent heat dissipation plates 120,120' may be coupled with each other.

Figure 3B:
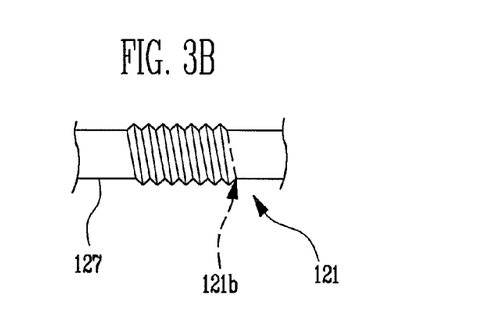
FIG. 3B illustrates an enlarged cross-sectional view along line B-B' of FIG. 3A.
Figure 6B:
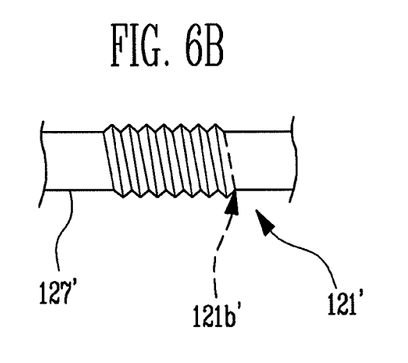
FIG. 6B illustrates an enlarged cross-sectional view along line D-D' of FIG. 6A.

Referring to FIGS. 3B and 6B, a connection groove 121b, 121b' (marked with dotted lines) may be formed at an end of the channel 121,121' or an additional connector (not shown) may be further provided, e.g., the additional connector may be attached through welding. A connection pipe 127,127' may be coupled to the connection groove 121b,121b' or the connector to connect adjacent channels 121,121' to each other. For example, the connection pipe 127, 127' may connect a channel 121,121' positioned in one heat dissipation plate 120, 120' to a channel 121,121' positioned in an adjacent heat dissipation plates 120,120'. It is noted, however, that the heat dissipation plate 120,120' may or may not include the connection pipe 127,127'.

Herein, unlike a conventional heat dissipation plate formed in multilayers including a channel plate and a blocking plate, the heat dissipation plate 120,120' according to the exemplary embodiments may be formed through extrusion to have an integral structure, e.g., the rib and channel may be integral with each other to define a single uniform structure without seams. The heat dissipation plate 120,120' may be made of a heat conductive metallic material, e.g., of aluminum which may impart light weight and heat conductivity. However, the materials used to form the heat dissipation plate 120,120' are not limited thereto, e.g., any suitable heat conductive metallic material may be used.

Referring to FIGS. 1 and 4, a housing 130,130' may house one or more battery modules 110,110', and the plurality of battery modules 110,110' may be arranged with the sides, e.g., major side surfaces, of the battery cells 10,10' facing each other. In detail, the battery modules 110,110' may be arranged in one direction and may include a plurality of battery cells 10,10' having positive terminals 11,11' and negative terminals 12,12'. As discussed previously, the battery cells 10, 0' may be arranged with wide surfaces of the adjacent battery cells 10,10' facing each other.

The battery cells 10,10' may be manufactured by housing an electrode assembly including a positive electrode plate, a negative electrode plate and a separator interposed therebetween, and an electrolytic solution in a battery case. The battery case housing the electrode assembly may be sealed by using a cap plate 14,14'. Electrode terminals, e.g., positive terminal 11, 11' connected with a positive plate and negative terminal 12, 12' connected with a negative plate, may be provided through the cap plate 14, 14' to protrude to the outside. Herein, the positive plate and the negative plate may generate electromechanical energy in a reaction with the electrolytic solution, so the generated energy is transferred to the outside through the positive terminal 11, 11' and the negative terminal 12, 12'. Further, a vent 13, 13' may be provided between the positive terminal 11, 11' and the negative terminal 12, 12' to serve as a passage for discharging gas.

In the exemplary embodiments, the battery cell 10, 10' is a lithium ion secondary battery described with respect to an angularly shaped case. However, example embodiments are not limited thereto, e.g., example embodiments may be applied to a lithium polymer battery or a cylindrical battery.

As illustrated in FIG. 1, the battery module 110 may include a plurality of battery cells 10, first and second end-plates 111 and 112 spatially separated from each other, and connection members 113 and 114 connecting the first and second end-plates 111 and 112. In the second exemplary embodiment, as illustrated in FIG. 4, the battery module 110' may include a plurality of battery cells 10' without end plates or connection members.

Referring back to FIG. 1, each of the first and second end plates 111 and 112 may be placed to surface-contact the outermost battery cell 10 and may press the plurality of battery cells 10 inwards. The connection members 113 and 114 connect the first and second end-plates 111 and 112. One end of each of the connection members 113 and 114 is joined to the first end-plate 111 and the other end of each of the connection members 113 and 114 is joined to the second end-plate 112. In this case, the first and second end-plates 111 and 112 and the connection members 113 and 114 may be joined by members, e.g., bolts, nuts, and the like.

Further, the connection members 113 and 114 connect the first and second end-plates 111 and 112 to provide a space where the plurality of battery cells 10 can be arranged and support both sides and the bottoms of the battery cells 10. In the exemplary embodiment, two side connecting members 113 supporting both sides of the battery cell 10 and one bottom connecting member 114 supporting the bottom of the battery cell 10 are shown, but the positions and shapes of the connection members 113 and 114 may be arbitrarily modified according to a design of the battery module 110. The battery cell 10 may be fixed to a space partitioned by the first and second end-plates 111 and 112, the side connecting member 113, and the bottom connecting member 114 not to easily move by external impacts.

Referring to FIGS. 1 and 4, the positive terminal 11,11' and the negative terminal 12,12' of two adjacent battery cells 10,10' may be electrically connected to each other through a bus-bar 15,15'. Holes through which the positive terminal 11,11' and the negative terminal 12,12' can pass are provided in the bus-bar 15,15', so the bus-bar 15,15' connected with the terminals passing through the holes may be fixed by members, e.g., nuts 16,16', and the like.

Further, a barrier 115,115' may be interposed between adjacent battery cells 10,10'. A spacer (not shown) may be provided in the barrier 115,115' to separate the plurality of adjacent battery cells 10,10' and to form a space between the battery cells 10,10', thereby providing an additional movement passage for cooling, e.g., for a refrigerant, the battery cells 10,10'.

In general, battery cells generate heat while performing charging and discharging operations. The generated heat may increase the temperature of the battery cells, thereby causing potential performance deterioration of the battery cells and decreasing safety. However, as the battery modules 110,110' according to example embodiments include heat dissipation plates 120,120' that contact the battery modules 110,110' and have increased surface area due to protrusions therein, cooling efficiency may be improved and the generated heat may be removed, thereby increasing battery safety and performance. Further, since the heat dissipation plate 120,120' is formed by extrusion to have an integral structure, the heat dissipation plate 120,120' may be cut and used according to user's needs, thereby preventing or substantially minimizing refrigerant leakage to improve cooling efficiency, simplifying assembly of the battery module 110,110', and reducing manufacturing costs thereof.

Hereinafter, referring to FIGS. 7A to 8, a flow direction of the refrigerant will be described.

Figure 7A:
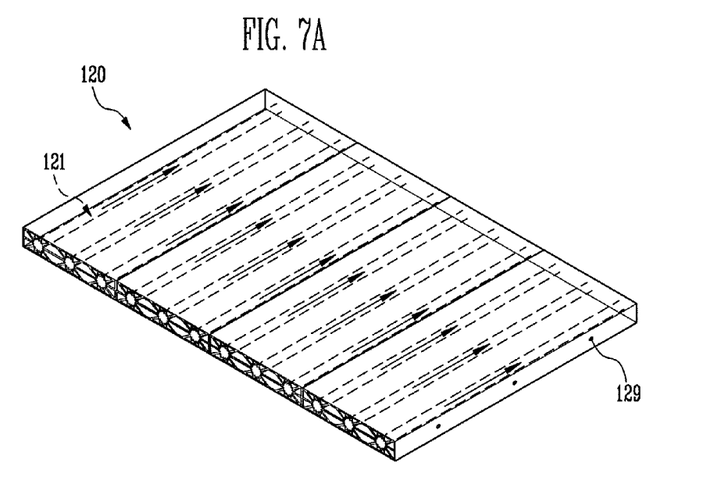

Referring to FIG. 7A, the refrigerant may pass through the channels 121 in a first direction or in a second direction opposite to the first direction. For example, a single source of refrigerant may be used to pump the refrigerant into all the channels 121 simultaneously, so the refrigerant may pass in a same direction through all the channels 121 simultaneously. At the end of the channels 121, the refrigerant may be removed simultaneously from all the channels 121.

Figure 7B:
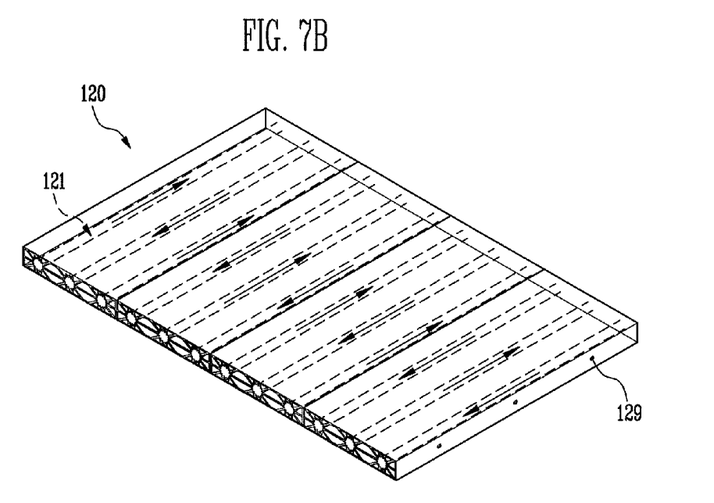

Referring to FIG. 7B, the refrigerant may pass in the first direction and the second direction in adjacent channels 121. For example, each two adjacent channels 121 may have opposite refrigerant flows, e.g., odd-numbered channels 121 may include one source providing simultaneous refrigerant in the first direction and even-numbered channels 121 may include another source providing simultaneous refrigerant in the second direction, thereby providing increased cooling efficiency.

Figure 8:
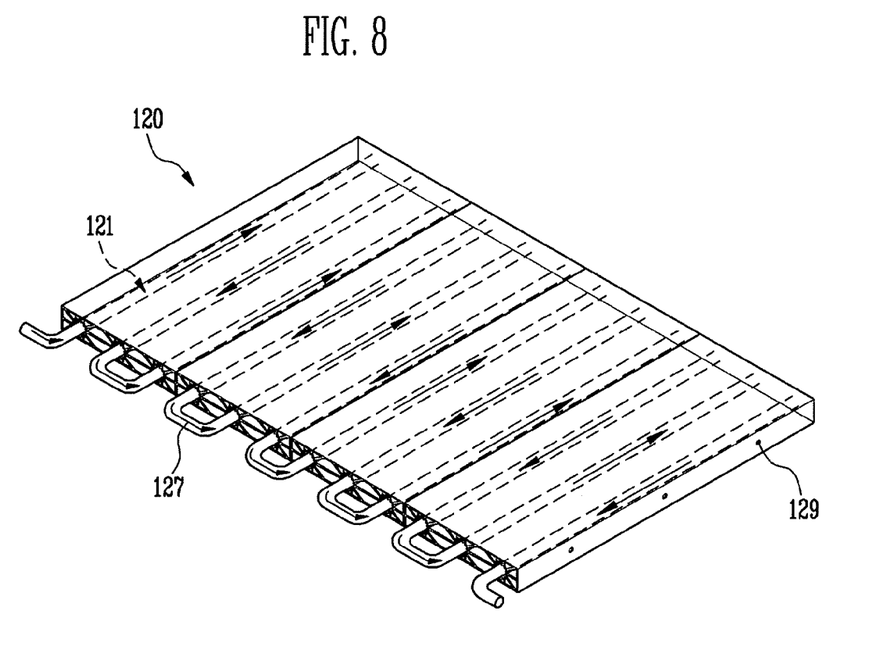

Referring to FIG. 8, the refrigerant may passes through multiple channels 121. That is, the refrigerant may pass through one channel 121 in the first direction, and thereafter, may pass through the connection member 127 into an adjacent channel 121 to pass therethrough in the second direction. Herein, the refrigerants in the adjacent channels 121 pass in the first direction and second direction, respectively, thereby providing increased cooling efficiency.

According to the exemplary embodiments, a battery pack may include an integral structure of a heat dissipation plate on electrode modules therein. The heat dissipation plate may include refrigerant flowing through channels therein, thereby improving heat dissipation during charging/discharging operations of the cell batteries. As a result, the assembly of the battery module can be improved, the weight of the battery module can be decreased, and the cost can also be reduced. Further, the leakage possibility of the refrigerant in the heat dissipation plate can be reduced and the cooling efficiency can be improved by increasing a heat exchange area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A battery pack, comprising: a battery module including at least one battery cell; and at least one heat dissipation plate in contact with the battery cell, the heat dissipation plate including: at least one channel defined by a channel wall and includes a refrigerant, a plurality of ribs radiating from the channel wall and arranged to define a frame of the heat dissipation plate, and a plurality of through-holes between the channel and the ribs, wherein the plurality of ribs are arranged in a criss-cross structure to form a lattice, wherein the ribs and channel wall of the heat dissipation plate are integral with each other to define a single uniform structure.

2. The battery pack as claimed in claim 1, wherein the channel extends through the rib and includes at least one protrusion.

3. The battery pack as claimed in claim 1, wherein the heat dissipation plate further comprises a connection groove at an end of the at least one channel.

4. The battery pack as claimed in claim 3, wherein the heat dissipation plate further comprises a connection pipe connected to the connection groove, the connection groove being between the connection pipe and the channel.

5. The battery pack as claimed in claim 4, wherein the connection pipe connects two adjacent channels in the heat dissipation plate.

6. The battery pack as claimed in claim 5, wherein the heat dissipation plate includes at least two separate heat dissipation plate portions, the at least two heat dissipation plate portions being adjacent to each other, and the connection pipe connects channels in the at least two heat dissipation plate portions.

7. The battery pack as claimed in claim 1, further comprising at least one joint in the heat dissipation plate.

8. The battery pack as claimed in claim 7, wherein the joint is on a sidewall or on a bottom of the heat dissipation plate, the joint being placed where the battery module, the channel, the rib, and the through-hole are not positioned.

9. The battery pack as claimed in claim 8, further comprising a joining member, the joining member being coupled to the joint to connect adjacent heat dissipation plate portions of the heat dissipation plate.

10. The battery pack as claimed in claim 1, wherein a plurality of battery cells in the battery module are placed in parallel to a gravity direction, the heat dissipation plate being below at least one battery module.

11. The battery pack as claimed in claim 1, wherein a plurality of battery cells in the battery module are placed in parallel to a ground direction, the heat dissipation plate being between the adjacent battery modules.

12. The battery pack as claimed in claim 1, wherein the heat dissipation plate includes a heat conductive metallic material.

13. The battery pack as claimed in claim 12, wherein the heat dissipation plate includes aluminum.

14. The battery pack as claimed in claim 1, wherein the heat dissipation plate is configured to have the refrigerant flow through the channel in a first direction or in a second direction opposite to the first direction.

15. The battery pack as claimed in claim 1, wherein the heat dissipation plate is configured to have the refrigerant flow in opposite directions through adjacent channels.

16. The battery pack as claimed in claim 15, wherein the heat dissipation plate is configured to have the refrigerant flow sequentially through a first channel in a first direction and through a second channel adjacent the first channel in a second direction opposite the first direction.

17. The battery pack as claimed in claim 1, wherein the frame includes a plurality of lateral members defining a rectangular structure around and integral with the plurality of ribs and channel wall to define the single uniform structure.

* * * * *